Figure 1:
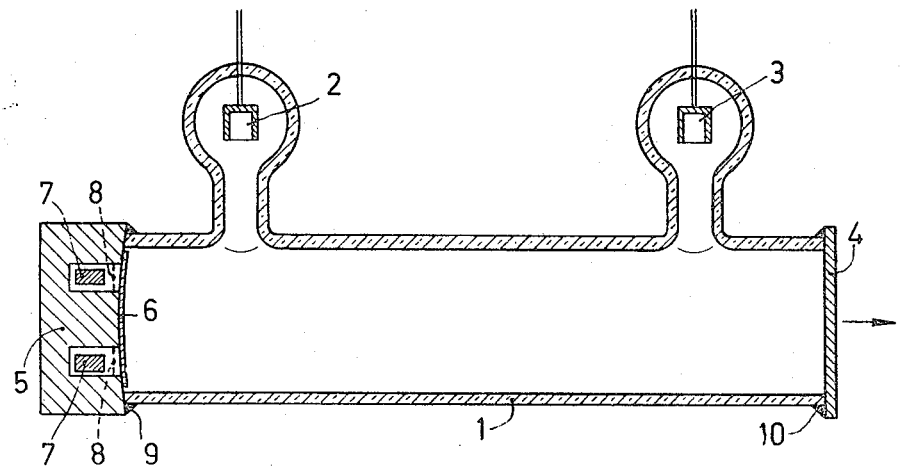

United States Patent
Timmermans et al.

[11] 3,855,543
[45] Dec. 17, 1974

[54] DEVICE FOR PRODUCING STIMULATED INFRARED EMISSION

[75] Inventors: Abraham Timmermans; Robertus Laurentius Clemens de Vaan, both of Emmasingel, Eindhoven, Netherlands

[73] Assignee: U.S. Philips Corporation, New York, N.Y.

[22] Filed: Jan. 22, 1973

[21] Appl. No.: 325,882

[30] Foreign Application Priority Data
Feb. 21, 1972 Netherlands.................. 7202271

[52] U.S. Cl.......... 331/94.5 T, 331/94.5 D, 330/4.3, 313/174
[51] Int. Cl............................................... H01s 3/22
[58] Field of Search.................... 331/94.5; 330/4.3; 313/174 X

[56] References Cited
UNITED STATES PATENTS

| | | | |
|---|---|---|---|
| 2,280,618 | 4/1942 | Besson............................ | 313/174 X |
| 2,442,824 | 6/1948 | Poyle.............................. | 313/174 X |
| 3,691,478 | 9/1972 | Jacobs et al..................... | 331/94.5 |
| 3,742,378 | 6/1973 | Timmermans..................... | 331/94.5 |

*Primary Examiner*—Ronald L. Wibert
*Assistant Examiner*—R. J. Webster
*Attorney, Agent, or Firm*—Frank R. Trifari

[57] ABSTRACT

A $CO_2$ laser in which zeolite is present and in which water vapor is incorporated in the zeolite. The temperature of the zeolite is determined by the produced laser beam, for example, by providing the zeolite in one of the mirrors. The amount of water vapor released by the zeolite is dependent on the temperature of the zeolite, and there is a water vapor pressure at which the efficiency of the stimulated emission is at a maximum. The zeolite is so placed that it derives the proper heat from the beam at maximum efficiency to give off the proper amount of water vapor to maintain this efficiency. As a result of this, the water vapor can remain adapted to the optimum operational pressure for a longer period of time.

8 Claims, 5 Drawing Figures

DEVICE FOR PRODUCING STIMULATED INFRARED EMISSION

The invention relates to a device for producing stimulated infrared emission, an iraser, by means of an electric discharge in a gas mixture containing at least carbon dioxide and water vapor. The gas mixture is in contact with a quantity of zeolite which is fully or partly saturated with water vapor. The invention furthermore relates to an electric discharge tube for such a device.

The above-described device and tube are known from the Dutch Patent 6,802,135. The water vapor absorbed in the zeolite must maintain the water vapor pressure in the discharge tube at the correct value when under the influence of the discharge, water vapor disappears in the electrodes or the tube wall, or decomposes. The water vapor present, promotes the stimulated emission due to the accelerated reduction of the occupation of the lower level, which is involved in the stimulated transition of the carbon dioxide.

A difficulty in the known device, is that a thermostat is necessary for the zeolite, because the water vapor pressure above the zeolite is strongly temperature-dependent. A thermostat in the otherwise rather simple arrangement of such an iraser makes it considerably more complicated and more expensive.

It is the object of the invention to provide an improvement in this respect.

According to the invention, in a device for producing stimulated infrared emission, an iraser, by means of an electric discharge in a gas mixture, containing at least carbon dioxide and water vapor, which gas mixture is in contact with a quantity of zeolite which is fully or partly saturated with water vapor, the zeolite is incorporated in a member of the iraser in which the temperature of the member is dependent upon the produced stimulated emission. The arrangement may be constructed so that at the maximum of the stimulated emission, or at the maximum efficiency, the zeolite reaches the desired temmperature, and hence the water vapor pressure reaches the desired value. In addition to the carbon dioxide and water vapour, one or more of the gases nitrogen, helium and xenon may be present.

In a first simple embodiment of the invention, the zeolite is incorporated in one or more cavities in the body of the mirror of the device not serving for coupling out. When stimulated emission is produced, a large quantity of radiation is refleclted at the mirrors of the device and a small part is absorbed. The mirror destined for coupling out, also passes radiation. As a result of the absorption of the radiation, the temperature of the mirror not destined for coupling out is increased, and as a result the water vapor can be liberated from the zeolite until the optimum pressure is reached. Should in fact the pressure increase further, the iraser action or the efficiency would be reduced as a result. The mirror not destined for coupling out may be, as usual, a block of aluminum of which the concave spherical surface facing the discharge is covered with a reflecting layer of gold. According to the invention, one or more spaces are provided on the discharge side for incorporating the zeolite. The spaces may also be present on the side of the mirror remote from the discharge. In that case, it is surrounded by an envelope which communicates with the discharge space. In this case, the mirror is not secured to the discharge tube by means of cement as is usual, but, for example, is under spring pressure.

In another embodiment, the zeolite is present in an annular holder inside the laser resonant cavity, but outside the discharge track. The holder is connected to a plate or wire which intercepts a part of the iraser beam inside the resonant cavity.

In a further embodiment, the zeolite is incorporated in a side tube which communicates with the laser resonant ccavity and the part of the side tube containing the zeolite is present entirely or partly in the path of the emitted laser beam. The advantage of this, is that the mode of oscillation in the resonant cavity is not disturbed, while the temperature of the zeolite can be adapted to the operating conditions by a partial screening or by influencing the thermal dissipation.

Figure 2:
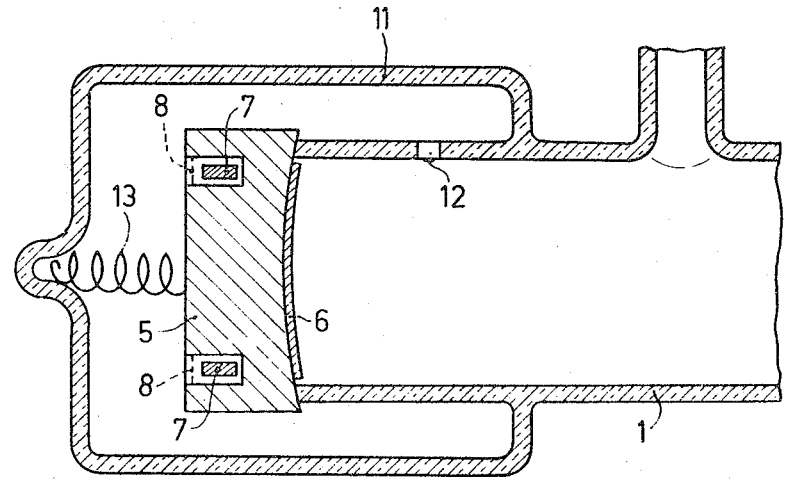
Figure 3:
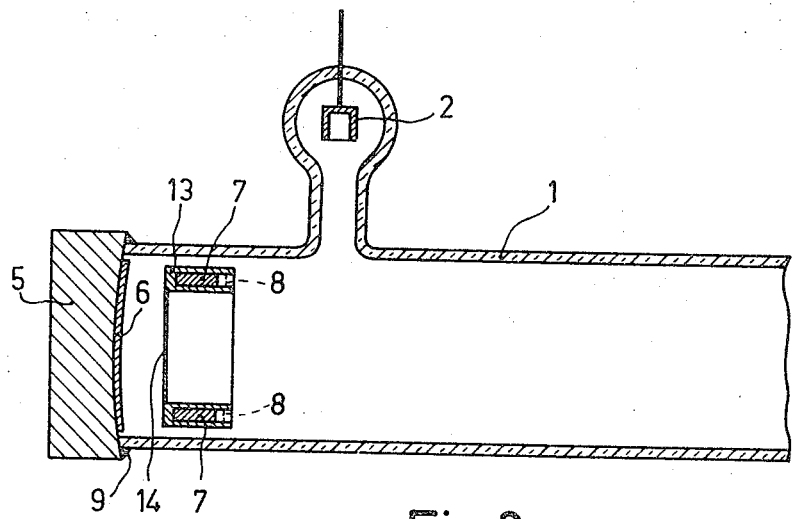
Figure 4:
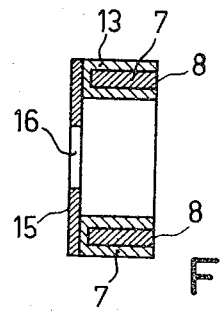
Figure 5:
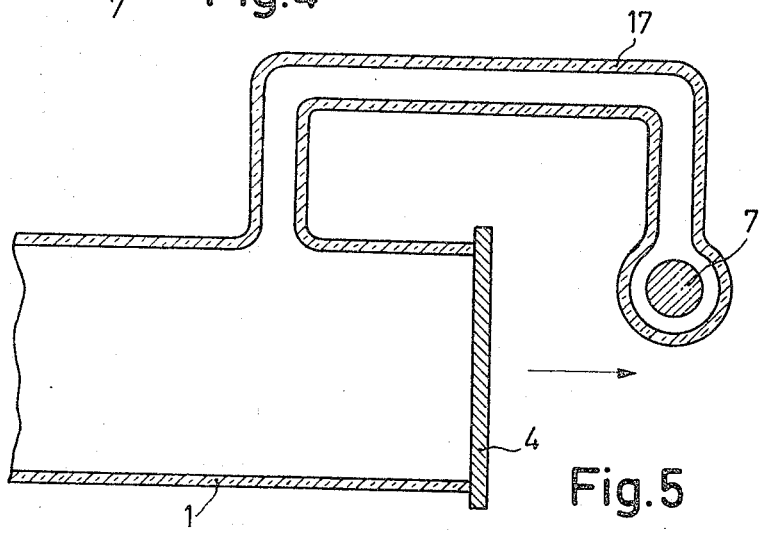

The invention will be desribed in greater detail with reference to the drawing, in which FIG. 1 shows diagrammatically a discharge tube for a device according to the invention, FIG. 2 shows another embodiment of the mirror with zeolite incorporated therein, FIG. 3 shows an embodiment with a holder for the zeolite in the laser resonant cavity, FIG. 4 shows another embodiment of the holder, and FIG. 5 shows a holder outside the resonant cavity.

In FIG. 1 reference numeral 1, denotes a quartz tube, 1.5 meters long, and having an inner diameter of 10 mm. Concave cylindrical platinum electrodes 2 and 3 are arranged in side tubes. On the right-hand side, the tube 1 is closed with a flat polished and etched germanium plate 4 of 2 mm thickness. On the left-hand side, the tube is closed by means of an aluminium block 5 having a concave face with a radius of curvature of 2½ meters, covered with a layer of gold 6. The gold layer 6 and the germanium plate 4 constitute the reflectors of the iraser, the with germanium plate also constituting the coupling-out window for the radiation which is denoted by an arrow. Pills 7 of zeolite having an overall weight of 150 mg, and approximately 80° saturated with water vapor, are present in a number of spaces in the mirror 5. Gauzes 8 pills 7 from dropping out. Cementing edges 9 and 10 connect the reflectors 4 and 5 to the tube 1 in a vacuum-tight manner. The tube 1 is filled with 1.5 Torr $CO_2$ 2 Torr $N_2$, 8 Torr He and 0.2 Torr $H_2O$. At an operating voltage of 14 kV, a current of 30 ma is conveyed through the tube of. An iraser beam of 60 Watt, at a wavelength of 10.6 $\mu$ in the single mode is obtained from window 4. Under the influence of the radiation reflected and partially absorbed at the gold layer 6, the temperature of the mirror 5 becomes approximately 90°C., when the tube is arranged in a normal space, and the tube itself is cooled with water of approximately 15°C over substantially its whole length between the reflectors. For the sake of simplicity, the cooling jacket is not shown in the drawing. The high temperature of the mirror 5, and hence of the store of zeolite, causes a vapor, pressure of at least 2 Torr $H_2O$ to always prevail so that the iraser can operate optimumally for a few thousand hours.

In FIG. 2, the zeolite in the pills 7 is not present in the spaces on the discharge side of the mirror, but on the opposite side. The mirror is incorporated in the envelope 11, which communicates with the space in the tube 1 through a hole 12. A spring 13 presses the mirror 5 against the tube 1.

In FIG. 3, the components corresponding to those of FIGS. 1 and 2 are referred to by the same reference numerals. The zeolite 7 covered by gauzes 8, is incorporated in the annular holder 13. Across the aperture in the holder, a molybdenum wire of 0.3 mm thickness 14 is stretched.

Such a wire only provides a certain polarization of the radiation which is emitted by the iraser, but does not interfere with the action of the lowest modes in which the iraser operates.

In FIG. 4, the holder 13 comprises a stop 15 having a circular aperture 16. Both the wire 14, and the plate 15 can withdraw sufficient thermal energy from the iraser beam to maintain the zeolite at the correct temperature.

In FIG. 5, the zeolite 7 is present in the end of a tube 17 which communicates with the discharge tube 1. The zeolite lies within at least a portion of the iraser beam and can absorb sufficient thermal energy from the beam which is denoted by an arrow.

In deviation from what is shown in FIG. 5, the radiant energy can be guided from a beam to the zeolite via a reflector instead of directly, so that the tube 17 can obtain a simpler shape. If desirable, the radiation can even be directed by the plate 4 to the zeolite, which is then arranged outside the beam in the tube 1.

What is claimed is:

1. In an iraser for producing stimulated infrared emission:

a discharge tube containing at least a mixture of carbon dioxide and water vapor;

electric discharge means supported by said discharge tube for producing an iraser beam; and means for maintaining the stimulated infrared emission substantially at the most efficient level for said tube by maintaining the pressure of said water vapor in said tube at a predetermined value, said means comprising a quantity of zeolite that contains water vapor and is disposed within said tube and is thermally coupled to said beam to be heated thereby to give off water vapor, the thermal coupling between said zeolite and said beam being such that said zeolite is heated to a predetermined temperature to give off enough water vapor to maintain said water vapor at said predetermined value when the stimulated emission is at substantially its maximum efficiency, the efficiency of said emission dropping when said water vapor exceeds said predetermined value.

2. The iraser of claim 1, wherein said discharge tube has two mirrors disposed therein at opposite ends thereof, one of said mirrors serving for coupling out, and the other mirror having at least one cavity therein for receiving said zeolite.

3. The iraser of claim 2 wherein the zeolite is disposed on a discharge side of said mirror.

4. The iraser of claim 2 wherein the zeolite is disposed opposite a discharge side of said mirror and said tube comprises an envelope section at one end section of said discharge tube, said envelope section communicating with the remainder of said discharge tube through an aperture in said tube.

5. The iraser of claim 1 comprising, in addition: a holder containing said zeolite disposed within said discharge tube, said tube comprising a resonant cavity and said holder being within said resonant cavity but lying outside a discharge track thereof, said holder comprising means disposed thereon for intercepting a part of said iraser beam for withdrawing sufficient thermal energy therefrom to maintain said zeolite at said predetermined temperature during operation of said device.

6. The iraser of claim 5 wherein said holder means comprises a plate.

7. The iraser of claim 5 wherein said holder means comprises a wire.

8. The iraser of claim 1 wherein said discharge tube comprises:

a side tube containing said zeolite in a portion thereof; and a resonant cavity, said zeolite-containing portion of the side tube communicating with said resonant cavity and lying approximately in the path of said iraser beam to extract sufficient thermal energy from said beam to maintain said zeolite at said predetermined temperature during operation of said device.

* * * * *